(12) United States Patent
Nguyen et al.

(10) Patent No.: US 9,699,200 B2
(45) Date of Patent: Jul. 4, 2017

(54) INLINE ARINC DATA AUTHENTICITY INSPECTION MODULE, METHOD AND COMPUTER PROGRAM PRODUCT

(71) Applicant: The Boeing Company, Chicago, IL (US)

(72) Inventors: Daniel Nguyen, Auburn, WA (US); Jason W. Shelton, Edgewood, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/706,427

(22) Filed: May 7, 2015

(65) Prior Publication Data

US 2016/0330242 A1 Nov. 10, 2016

(51) Int. Cl.
*H04L 29/06* (2006.01)

(52) U.S. Cl.
CPC ...... *H04L 63/1408* (2013.01); *H04L 63/1425* (2013.01)

(58) Field of Classification Search
CPC .. H04L 63/20; H04L 63/1408; H04L 63/1425
USPC .......................................................... 726/1
See application file for complete search history.

(56) References Cited

U.S. PATENT DOCUMENTS

| | | | | |
|---|---|---|---|---|
| 4,454,588 A * | 6/1984 | O'Brien | ................... | G06F 11/22 702/122 |
| 5,019,980 A * | 5/1991 | Starr | ..................... | G06F 11/349 340/945 |
| 6,629,149 B1 * | 9/2003 | Fraser | ............... | H04L 29/12066 709/220 |
| 6,937,164 B2 * | 8/2005 | Thomson | ........... | B64D 45/0015 340/425.5 |
| 7,136,030 B2 | 11/2006 | Steed et al. | | |
| 7,450,004 B2 | 11/2008 | Allen et al. | | |
| 7,791,473 B2 | 9/2010 | Allen et al. | | |
| 7,840,770 B2 | 11/2010 | Larson et al. | | |

(Continued)

FOREIGN PATENT DOCUMENTS

EP         3086519 A1    10/2016

OTHER PUBLICATIONS

Combined Search and Examination Report under Sections 17 and 18(3) for UK Patent Application No. GB1607471.8 dated Dec. 8, 2016, 6 pages.

*Primary Examiner* — Michael S McNally
(74) *Attorney, Agent, or Firm* — Alston & Bird LLP (57) ABSTRACT

An inline ARINC data authenticity inspection module, method and computer program product are provided. In the context of a method, ARINC data that is transmitted via an ARINC bus is received into a buffer partition. The method also includes inspecting the ARINC data from the buffer partition within an inspection partition. The method further includes determining, as a result of having inspected the ARINC data within the inspection partition, whether the ARINC data is authentic. In an instance in which the ARINC data is determined to not be authentic, the method logs receipt of the ARINC data that is determined to not be authentic. However, in an instance in which the ARINC data is determined to be authentic, the method permits data corresponding to the ARINC data to be transmitted to an intended destination.

17 Claims, 4 Drawing Sheets

(56) References Cited

U.S. PATENT DOCUMENTS

| | | |
|---|---|---|
| 7,908,042 B2 | 3/2011 | Brinkley et al. |
| 7,970,410 B2 | 6/2011 | Brinkley et al. |
| 8,023,949 B2 | 9/2011 | Horton, Jr. et al. |
| 8,095,014 B2 | 1/2012 | Erdos et al. |
| 8,331,926 B2 | 12/2012 | Mitchell et al. |
| 8,503,941 B2 | 8/2013 | Erdos et al. |
| 8,615,384 B2 | 12/2013 | Angus et al. |
| 8,769,608 B2 | 7/2014 | Sampigethaya et al. |
| 8,929,465 B2 | 1/2015 | Lee et al. |
| 8,942,865 B2 | 1/2015 | Kumar et al. |
| 8,973,101 B1 | 3/2015 | Sampigethaya et al. |
| 9,100,104 B2 | 8/2015 | Nguyen et al. |
| 2008/0250247 A1* | 10/2008 | Touzeau ............... H04L 9/3247 713/178 |
| 2009/0064326 A1* | 3/2009 | Goldstein ........... H04L 63/0227 726/22 |
| 2009/0077265 A1 | 3/2009 | Brinkley et al. |
| 2009/0112569 A1 | 4/2009 | Angus et al. |
| 2009/0121866 A1 | 5/2009 | Allen et al. |
| 2010/0251370 A1 | 9/2010 | Sun et al. |
| 2012/0210387 A1 | 8/2012 | Sampigethaya et al. |
| 2012/0265509 A1 | 10/2012 | Mier et al. |
| 2014/0210598 A1 | 7/2014 | Mitchell et al. |
| 2014/0236394 A1 | 8/2014 | Kumar et al. |
| 2014/0254693 A1 | 9/2014 | Mitchell et al. |
| 2014/0312682 A1 | 10/2014 | Lee et al. |
| 2014/0314160 A1 | 10/2014 | Lee et al. |
| 2014/0341309 A1 | 11/2014 | Nguyen et al. |
| 2015/0023437 A1 | 1/2015 | Nguyen et al. |
| 2015/0051788 A1 | 2/2015 | Lee et al. |
| 2015/0215899 A1 | 7/2015 | Kumar et al. |
| 2015/0227647 A1 | 8/2015 | Shelton et al. |

* cited by examiner

INLINE ARINC DATA AUTHENTICITY INSPECTION MODULE, METHOD AND COMPUTER PROGRAM PRODUCT

TECHNOLOGICAL FIELD

An example embodiment of the present disclosure relates generally to the inspection of data transmitted via a data bus to determine the authenticity of the data and, more particularly, to the inline inspection of Aeronautical Radio, Incorporated (ARINC) data transmitted via an ARINC bus to determine the authenticity of the ARINC data.

BACKGROUND

Avionics data is frequently transmitted from various sources of the avionics data to one or more avionics endpoints, such as various types of avionics equipment, utilizing an ARINC protocol. For example, the avionics data may be transmitted as data packets in accordance with an ARINC 429 protocol. At least some sources of ARINC data as well as at least some avionics endpoints that receive the ARINC data do not perform data validation other than the verification of various header fields. As such, a system that relies upon an ARINC protocol for the transmission of data from various sources to various avionics endpoints may be susceptible to various types of attack brought about malformed data packets. These attacks may be orchestrated for various purposes including an attack intended to facilitate access to other, for example, proprietary data maintained by or to one or more of the avionics endpoints. Alternatively, an attack may be performed in order to reduce the effectiveness of the avionic systems and/or one or more components, such as one or more of the avionics endpoints, of the avionics system or to completely halt the operation of the avionics system.

The failure to inspect data transmitted via an ARINC protocol also limits the forensic analysis that might otherwise be performed following an attack. In this regard, following an attack, it may be difficult to identify the data and/or the source of the data that included the malformed data packets that precipitated the attack since no record of the malformed data packets was maintained. These limitations may therefore restrict the forensic analysis of an attack and make it more difficult to identify the perpetrator of the attack and/or to take measures to reduce the likelihood that future attacks will be successful.

BRIEF SUMMARY

An inline ARINC data authenticity inspection module, method and computer program product are provided in accordance with example embodiments of the present disclosure. The inline ARINC data authenticity inspection module, method and computer program product permit the ARINC data to be confirmed as authentic prior to permitting data corresponding to the ARINC data to be transmitted to the intended destination. In instances in which the ARINC data is determined to not be authentic, a log entry may be created and, in some embodiments the ARINC data may be flagged, thereby facilitating further review of the ARINC data that is determined to not be authentic and/or the source of the ARINC data that is determined to not be authentic.

In an example embodiment, an inline ARINC data authenticity inspection module is provided that includes processing circuitry configured to inspect ARINC data. The processing circuitry is configured to receive ARINC data transmitted via an ARINC bus into a buffer partition. The processing circuitry is also configured to inspect the ARINC data from the buffer partition within an inspection partition. Additionally, the processing circuitry is configured to determine, as a result of having inspected the ARINC data within the inspection partition, whether the ARINC data is authentic. In an instance in which the ARINC data is determined to not be authentic, the processing circuitry is configured to log receipt of the ARINC data that is determined to not be authentic. However, in an instance in which the ARINC data is determined to be authentic, the processing circuitry is configured to permit data corresponding to the ARINC data to be transmitted to an intended destination.

The processing circuitry of an example embodiment is configured to receive the ARINC data from a source, and to additionally log the source of the ARINC data that is determined to not be authentic. The processing circuitry of an example embodiment is further configured to, in an instance in which the ARINC data is determined to not be authentic, prevent transmission of the ARINC data to the intended destination. The processing circuitry of an example embodiment is configured to permit the data to be transmitted by providing the ARINC data to a forwarding partition that is configured to transmit the data corresponding to the ARINC data to the intended destination. In an example embodiment, the processing circuitry is further configured to, in an instance in which the ARINC data is determined to not be authentic, flag the ARINC data. In an example embodiment, the processing circuitry is further configured to convert the ARINC data to data having another protocol prior to permitting the data having the other protocol and corresponding to the ARINC data to be transmitted to the intended destination.

The processing circuitry of an example embodiment is configured to inspect the ARINC data by maintaining a rule listing associated with a respective ARINC data label and inspecting the ARINC data for compliance with the rule listing to determine that the ARINC data is authentic. In this example embodiment, the processing circuitry is further configured to receive, following inspection of at least some ARINC data, a modification of the rule listing associated with a respective ARINC data label such that subsequent inspection of the ARINC data determines compliance with the modification of the rule listing to determine that the ARINC data is authentic.

In another example embodiment, a method is provided of conducting an inline inspection of ARINC data. The method includes receiving ARINC data transmitted via an ARINC bus into a buffer partition. The method also includes inspecting the ARINC data from the buffer partition within an inspection partition. The method further includes determining, as a result of having inspected the ARINC data within the inspection partition, whether the ARINC data is authentic. In an instance in which the ARINC data is determined to not be authentic, the method logs receipt of the ARINC data that is determined to not be authentic. However, in an instance in which the ARINC data is determined to be authentic, the method permits data corresponding to the ARINC data to be transmitted to an intended destination.

The method of an example embodiment receives the ARINC data from a source and logs the source of the ARINC data that is determined to not be authentic. The method of an example embodiment further includes, in an instance in which the ARINC data is determined to not be authentic, preventing transmission of the ARINC data to the intended destination. In an example embodiment, the method permits the data to be transmitted by providing the ARINC data to a forwarding partition that is configured to transmit data corresponding to the ARINC data to the intended destination. In an instance in which the ARINC data is determined to not be authentic, the method of an example embodiment also flags the ARINC data. The method of an example embodiment also includes converting the ARINC data to data having another protocol prior to permitting the data having the other protocol and corresponding to the ARINC data to be transmitted to the intended destination.

The method of an example embodiment inspects the ARINC data by maintaining a rule listing associated with a respective ARINC data label and inspecting the ARINC data for compliance with the rule listing to determine that the ARINC data is authentic. In this example embodiment, the method also includes receiving, following inspection of at least some ARINC data, a modification of the rule listing associated with a respective ARINC data label such that subsequent inspection of the ARINC data determines compliance with the modification of the rule listing to determine that the ARINC data is authentic.

In a further example embodiment, a computer program product is provided that includes at least one non-transitory computer readable medium having program code portions stored thereon with the program code portions being configured, upon execution, to receive ARINC data transmitted via an ARINC bus into a buffer partition. The program code portions are also configured to inspect the ARINC data from the buffer partition within an inspection partition and to determine, as a result of having inspected the ARINC data within the inspection partition, whether the ARINC data is authentic. In an instance in which the ARINC data is determined to not be authentic, the program code portions are configured to log receipt of the ARINC data that is determined to not be authentic. However, in an instance in which the ARINC data is determined to be authentic, the program code portions are configured to permit data corresponding to the ARINC data to be transmitted to an intended destination.

The program code portions configured to receive the ARINC data may include program code portions configured to receive the ARINC data from a source, and the program code portions configured to log receipt of the ARINC data may include program code portions configured to log the source of the ARINC data that is determined to not be authentic. The program code portions of an example embodiment are further configured, in an instance in which the ARINC data is determined to not be authentic, to prevent transmission of the ARINC data to the intended destination. The program code portions configured to permit the data to be transmitted may include program code portions configured to provide the ARINC data to a forwarding partition that is configured to transmit data corresponding to the ARINC data to the intended destination.

The program code portions configured to inspect the ARINC data may include program code portions configured to maintain a rule listing associated with a respective ARINC data label and program code portions configured to inspect the ARINC data for compliance with the rule listing to determine that the ARINC data is authentic. In this example embodiment, the program code portions are further configured to receive, following inspection of at least some ARINC data, a modification of the rule listing associated with a respective ARINC data label such that subsequent inspection of the ARINC data determines compliance with the modification of the rule listing to determine that the ARINC data is authentic.

BRIEF DESCRIPTION OF THE DRAWINGS

Having thus described embodiments of the present disclosure in general terms, reference will now be made to the accompanying drawings, which are not necessarily drawn to scale, and wherein:

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

An inline ARINC data authenticity inspection module, method and computer program product are provided in accordance with example embodiments of the present disclosure. The ARINC data authenticity inspection module permits ARINC data to be inspected inline during transmission from a source to an intended destination, such as an avionics endpoint. As such, the ARINC data may be confirmed as authentic prior to permitting data corresponding to the ARINC data to be transmitted to the intended destination, thereby protecting the intended destination and the overall system from an attack occasioned by ARINC data having malformed packet(s). Moreover, the inline ARINC data authenticity inspection module facilitates subsequent forensic analysis of the system following an attack by causing ARINC data that is determined to not be authentic, such ARINC data having malformed packets, to be logged and/or flagged.

Figure 1:
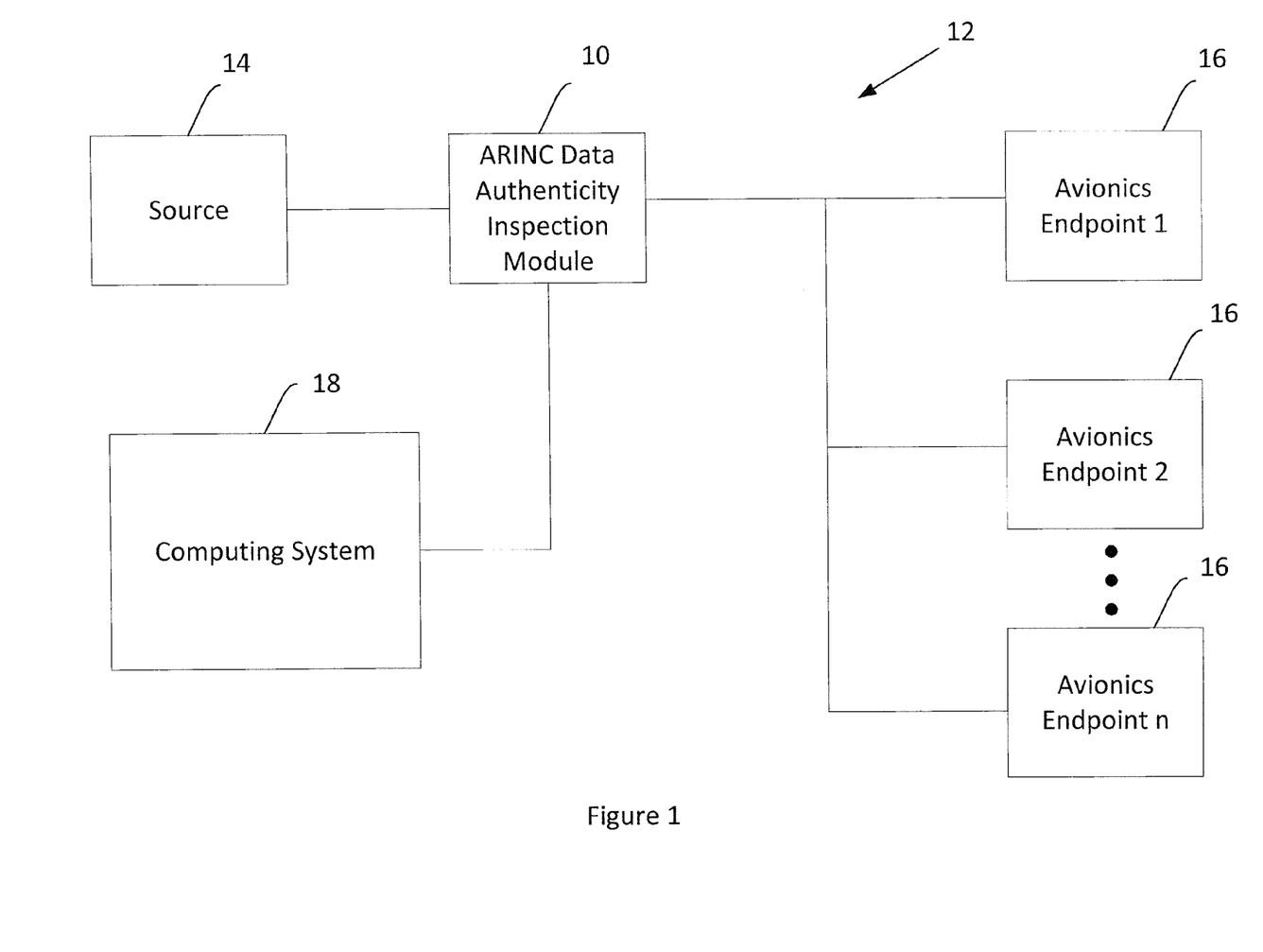
FIG. 1 is a block diagram of a system for conducting an inline inspection of ARINC data in accordance with an example embodiment of the present disclosure.

The inline ARINC data authenticity inspection module 10 is generally a component of an avionics communications system 12 as shown in FIG. 1. In this regard, the inline ARINC data authenticity inspection module 10 may be positioned inline between one or more sources 14 of the avionic data and one or more intended destinations of the ARINC data. As shown in FIG. 1, the ARINC data authenticity inspection module 10 is disposed between a source 14 of the ARINC data and a plurality of avionics endpoints 16, such as line replaceable units, designated avionic end point 1, avionic end point 2, . . . avionic end point n. As such, the ARINC data authenticity inspection module 10 is configured to inspect the ARINC data provided by the source 14 prior to delivering data corresponding to the ARINC data to the intended destination, such as a respective avionic endpoint 16.

As described below, in an instance in which the ARINC data provided by the source 14 is determined by the ARINC data authenticity inspection module 10 to not be authentic, the ARINC data authenticity inspection module may take one or more actions. In this regard, the ARINC data authenticity inspection module 10 may be configured to log the receipt of the ARINC data that has been determined to not be authentic, such as by providing the ARINC data that has been determined to not be authentic to a computing system 18, such as an onboard network server (ONS). The computing system 18 may, in turn, store the ARINC data that has been determined to not be authentic in order to support future forensic analysis of the ARINC data. In addition, the ARINC data authenticity inspection module 10 of an example embodiment may prevent the ARINC data that has been determined to not be authentic from being transmitted to the intended destination. Additionally or alternatively, the ARINC data authenticity inspection module 10 may be configured to flag the ARINC data as being ARINC data that is determined to not be authentic. In this example embodiment, the flagged ARINC data may be provided to the computing system 18 for logging purposes and subsequent forensic analysis and/or to the intended destination.

Figure 2:
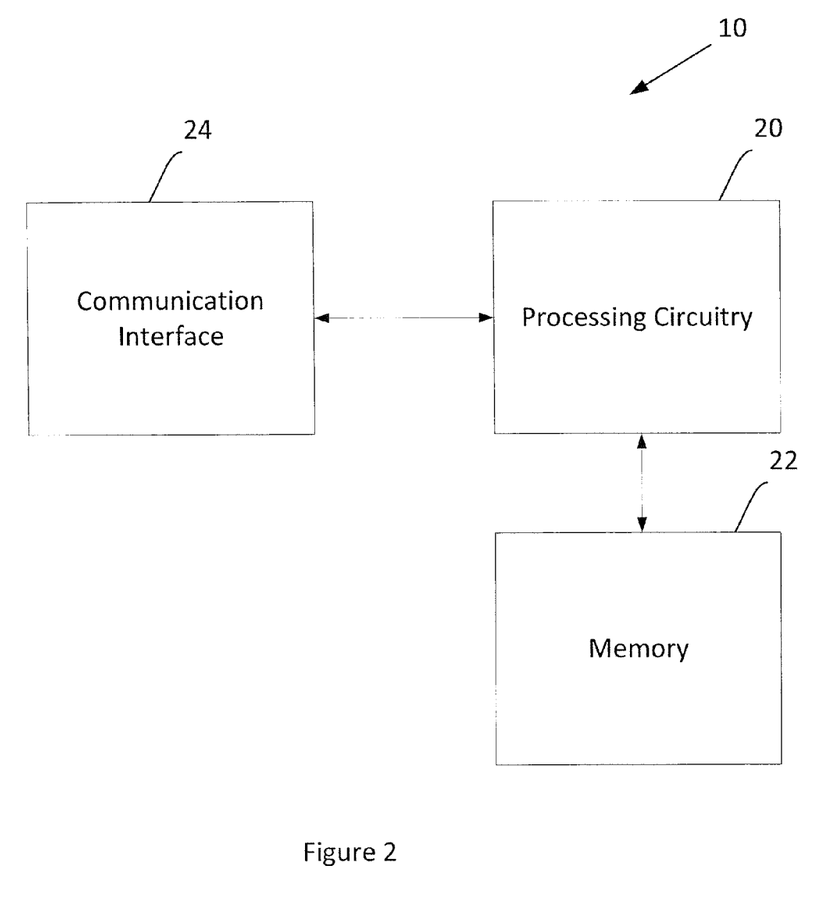
FIG. 2 is a block diagram of an inline ARINC data authenticity inspection module in accordance with an example embodiment of the present disclosure.

The ARINC data authenticity inspection module 10 may be configured in various manners. In an example embodiment, the ARINC data authenticity inspection module 10 may be embodied by computing device, such as a computing device that includes or is otherwise associated with a processing circuitry 20, a memory 22 and a communication interface 24 as depicted in FIG. 2. In this regard, the processing circuitry 20 may be in communication with the memory device 22 via a bus for passing information among components of the ARINC data authenticity inspection module 10. The memory device 22 may be non-transitory and may include, for example, one or more volatile and/or non-volatile memories. In other words, for example, the memory device 22 may be an electronic storage device (for example, a computer readable storage medium) comprising gates configured to store data (for example, bits) that may be retrievable by a machine (for example, a computing device like the processing circuitry 20). The memory device 22 may be configured to store information, data, content, applications, instructions, or the like for enabling the ARINC data authenticity inspection module 10 to carry out various functions in accordance with an example embodiment of the present disclosure. For example, the memory device 22 could be configured to buffer input data for processing by the processing circuitry 20. Additionally or alternatively, the memory device 22 could be configured to store instructions for execution by the processing circuitry 20.

The processing circuitry 20 may be embodied in a number of different ways. For example, the processing circuitry 20 may be embodied as one or more of various hardware processing means such as one or more processors, a coprocessor, a microprocessor, a controller, a digital signal processor (DSP), a processing element with or without an accompanying DSP, or various other types of processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, the processing circuitry 20 may be configured to execute instructions stored in the memory device 22 or otherwise accessible to the processing circuitry. Alternatively or additionally, the processing circuitry 20 may be configured to execute hard coded functionality. As such, whether configured by hardware or software methods, or by a combination thereof, the processing circuitry 20 may represent an entity (for example, physically embodied in circuitry) capable of performing operations according to an embodiment of the present disclosure while configured accordingly. Thus, for example, when the processing circuitry 20 is embodied as an ASIC, FPGA or the like, the processing circuitry may be specifically configured hardware for conducting the operations described herein. Alternatively, as another example, when the processing circuitry 20 is embodied as an executor of software instructions, the instructions may specifically configure the processing circuitry to perform the algorithms and/or operations described herein when the instructions are executed. However, in some cases, the processing circuitry may be a processor of a specific device (for example, the computing device). The processing circuitry 20 may include, among other things, a clock, an arithmetic logic unit (ALU) and logic gates configured to support operation of the processing circuitry.

The ARINC data authenticity inspection module 10 of an example embodiment also includes a communication interface 24 that may be any means such as a device or circuitry embodied in either hardware or a combination of hardware and software that is configured to receive and/or transmit data from/to other devices in communication with the ARINC data authenticity inspection module, such as the source 14 of the ARINC data, the avionics endpoints 16 and the computing device 18. In this regard, the communication interface may include, for example, a transmitter and/or a receiver for supporting, for example, wireline communications. In some environments, the communication interface may alternatively or also support wireless communication.

Figure 3:
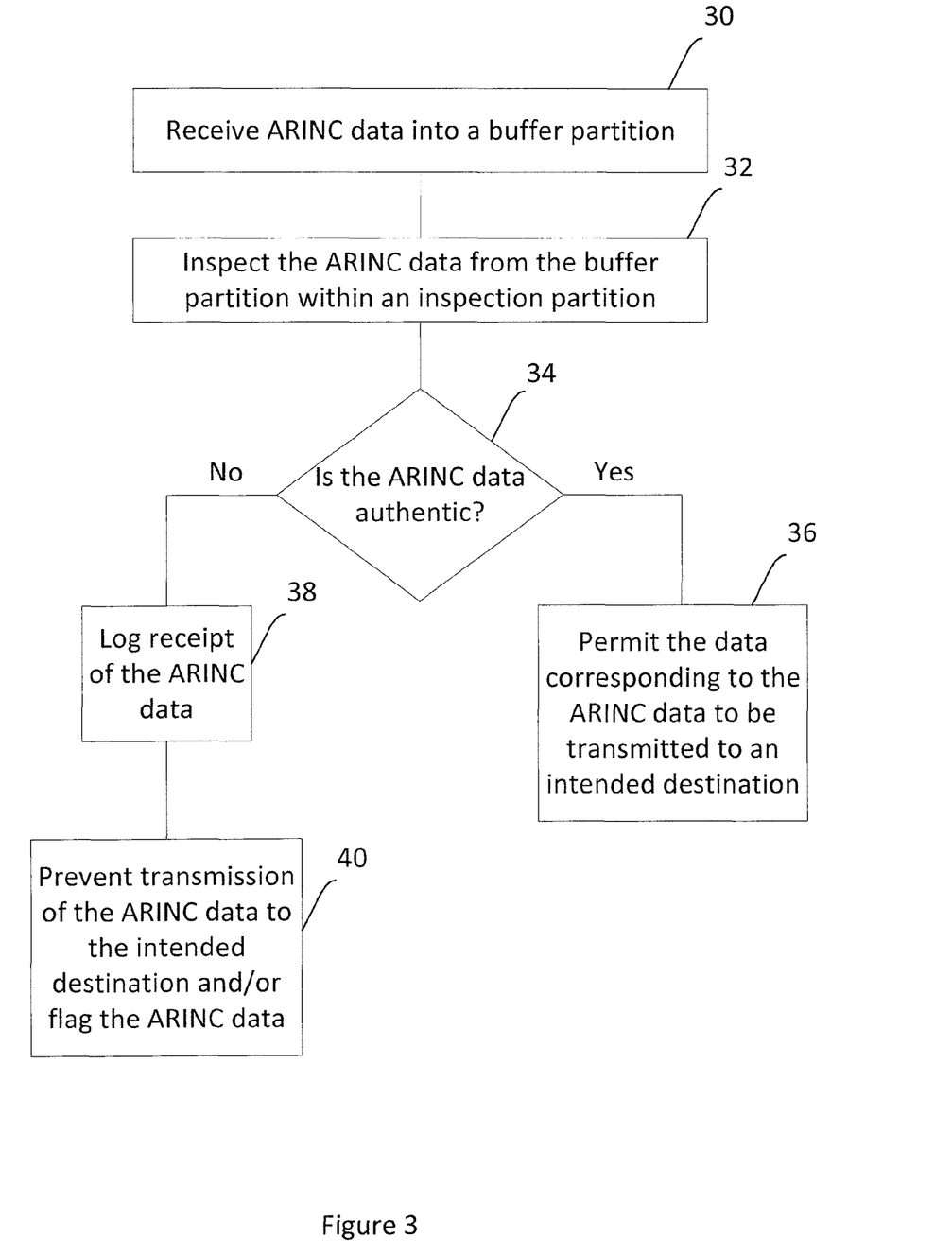
FIG. 3 is a flowchart of the operations performed, such as by the inline ARINC data authenticity inspection module of FIG. 2, in accordance with an example embodiment of the present disclosure.

As shown in FIG. 3, the operations performed by an ARINC data authenticity inspection module 10 in accordance with an example embodiment of the present disclosure are depicted. As described above in conjunction with FIG. 1 and as also shown in block 30 of FIG. 3, the ARINC data authenticity inspection module 10 is configured to receive ARINC data. For example, the ARINC data may be formed of a plurality of data packets transmitted in accordance with an ARINC protocol, such as the ARINC 429 protocol. In one embodiment, the communication interface 24 of the inline ARINC data authenticity inspection module 10 may be configured to receive ARINC data transmitted by a source 14 via an ARINC protocol and may, in turn, provide the ARINC data to the processing circuitry 20 and/or memory 22 of the inline ARINC data authenticity inspection module.

Figure 4:
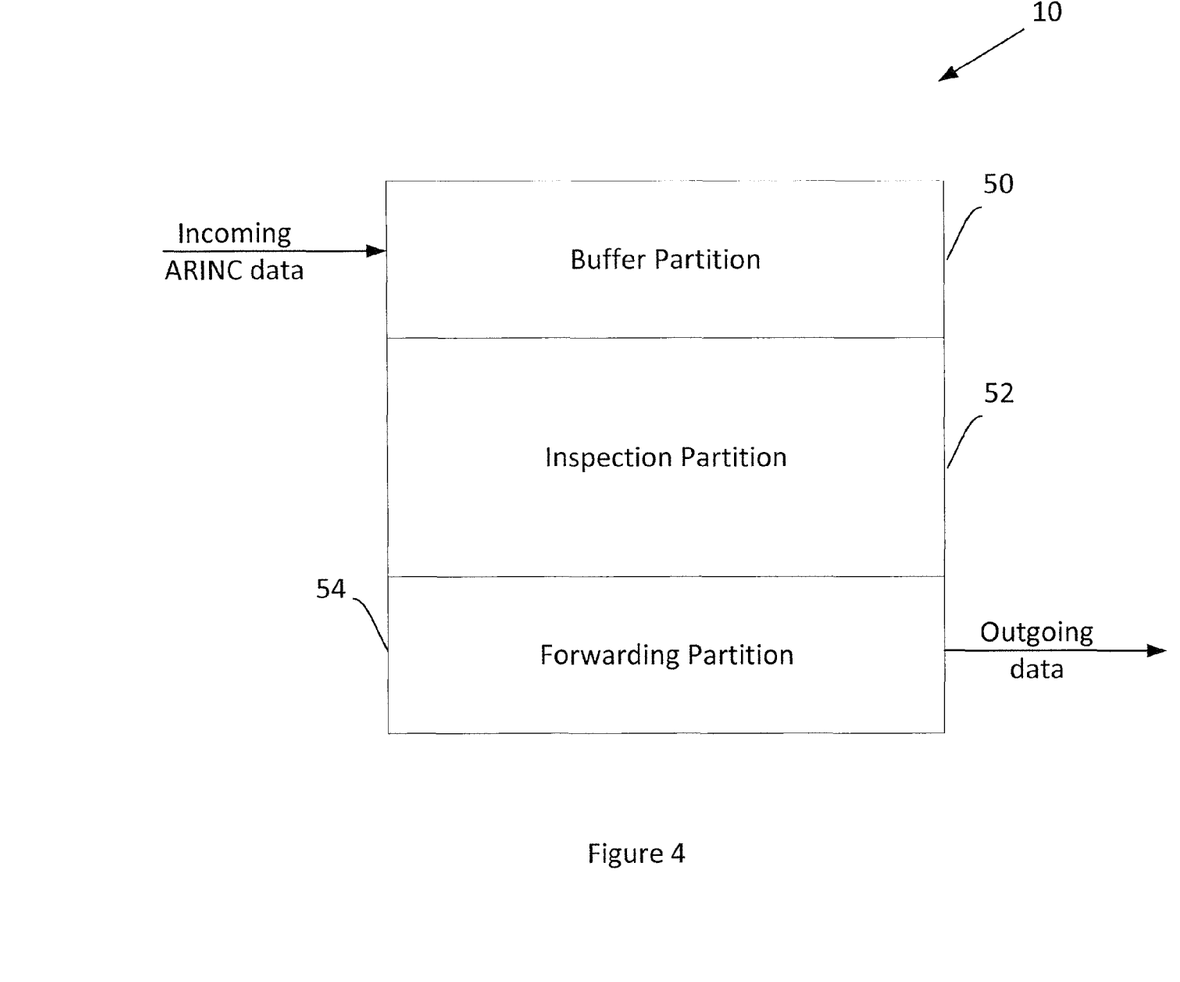
FIG. 4 illustrates the buffer, inspection and forwarding partitions of an inline ARINC data authenticity inspection module in accordance with an example embodiment of the present disclosure.

As shown in FIG. 4, the inline ARINC data authenticity inspection module 10 and, more particularly, the processing circuitry 20 of the inline ARINC data authenticity inspection module, may be configured to include a plurality of partitions arranged sequentially in order to appropriately process the ARINC data that is received. In this regard, the processing circuitry 20 of the inline ARINC data authenticity inspection module 10 may include a buffer partition 50 such as embodied, for example, by a memory buffer, for receiving the ARINC data transmitted via the ARINC bus and for at least temporarily storing the ARINC data that is received.

As shown in block 32 of FIG. 3, the inline ARINC data authenticity inspection module 10, such as the processing circuitry 20, is also configured to inspect the ARINC data that has been received, such as by the buffer partition 50. In this regard, the processing circuitry 20 of an example embodiment also includes an inspection partition 52 in communication with and downstream of the buffer partition 50 so as to receive the ARINC data from the buffer partition to be inspected. The processing circuitry 20, such as the inspection partition 52, of the ARINC data authenticity inspection module 10 may be configured to inspect the ARINC data in various manners. For example, the processing circuitry 20 may be configured to inspect the ARINC data to ensure compliance with predefined specifications, such as predefined specifications that defines the manner in which ARINC data is to be formatted in accordance with the respective ARINC protocol, such as ARINC 429 protocol, utilized by the ARINC bus in conjunction with the transmission of the ARINC data. As another example, the processing circuitry 20, such as the inspection partition 52, may be configured to inspect the ARINC data for compliance with a specification associated with the source 14 of the ARINC data and/or the intended destination of the ARINC data. For example, in an instance in which the intended destination, such as a respective avionics endpoint 16, is configured to recognize and act upon a limited set of commands, the processing circuitry 20, such as the inspection partition 52, may be configured to inspect the ARINC data to insure that all of the commands are included in the limited set of commands in order for the ARINC data to be considered compliant. Additionally or alternatively, the processing circuitry 20, such as this inspection partition 52, may be configured to inspect the ARINC data in accordance with a variety of different rules or other requirements. These rules or other requirements may be defined in order to identify particular types of attacks. As such, as additional or newer types of attacks are developed, the rules and other requirements utilized by the processing circuitry 20, such as the inspection partition 52, to inspect the ARINC data may be updated or otherwise modified such that the ARINC data is inspected in accordance with the most relevant set of rules and other requirements.

In an example embodiment, the processing circuitry 20, such as the buffer partition 50, is configured to sort the ARINC data that is received based upon an ARINC data label associated with respective packets of the ARINC data. The ARINC data label may be defined in various manners, but, in one embodiment, is defined based upon the type of ARINC protocol, such as ARINC 429 protocol, that is utilized. In this example, different type of data, such as data representing different parameters, may be identified with different data labels. However, the data labels may be defined in other manners, such as based upon the source 14 of the ARINC data and/or the intended destination of the ARINC data.

In an example embodiment, the processing circuitry 20, such as the inspection partition 52, is configured to maintain or otherwise have access to a rule listing associated with a respective ARINC data label. Thus, different rule listings may be associated with different ones of the ARINC data labels. As such, the processing circuitry 20, such as the inspection partition 52, may be configured to inspect ARINC data having a respective ARINC data label for compliance with the rule listing associated with the respective ARINC data label to determine whether or not the ARINC data is authentic based upon its compliance or lack of compliance, respectively, with the rule listing. By employing different rule listings with different ARINC data labels, different types of ARINC data (having different ARINC data labels) may be differently inspected, such as by being inspected in accordance with different rule listings associated with the respective ARINC data labels.

In this example embodiment, some ARINC data may be received by the inline ARINC data authenticity inspection module 10 and inspected thereby. Thereafter, the rule listing associated with a respective ARINC data label may be modified, such as to be tailored to the detection of more recent types of attacks. Thus, subsequent inspection of ARINC data includes a determination of whether the ARINC data received following the modification of the rule listing complies with the modification of the rule listing in order to determine whether or not the ARINC data is authentic. Thus, the rule listing associated with each different type of ARINC data may be modified, such as being updated, over the course of time.

As shown in block 34, ARINC data authenticity inspection module 10, such as the processing circuitry 20, is configured to determine whether the ARINC data is authentic as a result of having inspected the ARINC data. In this regard, the ARINC data may be determined to be authentic in an instance in which the packets of the ARINC data are determined to be compliant with the rules, such as a rule listing, governing the inspection process. Alternatively, the ARINC data may be determined to not be authentic in an instance in which the packets of the ARINC data are determined to be non-compliant with respect to the rules, such as the rule listing, that governs the inspection of the ARINC data.

In an instance in which the ARINC data is determined to be authentic, the inline ARINC data authenticity inspection module 10, such as the processing circuitry 20 and/or the communication interface 24, may be configured to permit data corresponding to the ARINC data to be transmitted to the intended destination, such as a respective avionics endpoint 16. See block 36 of FIG. 3. In this regard, the processing circuitry 20 of an example embodiment includes a forwarding partition 54 as shown in FIG. 4 that pulls the ARINC data that has been determined to be authentic from the inspection partition 52 and then transmits data corresponding to the ARINC data to the intended destination. In this regard, the forwarding partition 54 may be configured to pull the ARINC data from the inspection partition 52 for transmission to the intended destination since pulling the data is more secure than pushing the ARINC data from the inspection partition to the forwarding partition.

In an example embodiment, the inline ARINC data authenticity inspection module 10, such as the processing circuitry 20 and/or the communication interface 24, may be configured to permit the ARINC data to be transmitted via the ARINC bus to the intended destination. Alternatively, the inline ARINC data authenticity inspection module, such as the processing circuitry 20, e.g., the inspection partition 52 or the forwarding partition 54, may be configured to convert the ARINC data to corresponding data of another protocol, such as by converting ARINC data to data formatted in accordance with an IEEE 802.3 protocol, that is, the standard specification for Ethernet. Following the conversion of the data to the other protocol, the data corresponding to the ARINC data, although now formatted in accordance with another protocol, is permitted to be transmitted to the intended destination. In an example embodiment, the inline ARINC data authenticity inspection module may be configured to convert the ARINC data into any one of a plurality of different protocols depending upon various factors, such as the protocol preference of the intended destination, instructions included in association with the ARINC data or the like.

Alternatively, in an instance in which the ARINC data is determined to not be authentic, the receipt of the ARINC data is logged as shown in block 38 of FIG. 2. In an example embodiment, the ARINC data authenticity inspection module 10, such as the processing circuitry 20, the memory 22, the communications interface 24 or the like, may log the receipt of the ARINC data that is determined to not be authentic, such as by storing a record of the ARINC data and, in some embodiments, an indication that the ARINC data was determined to not be authentic in memory 22. Alternatively, or additionally, the inline ARINC data authenticity inspection module 10 may be configured to provide either an indication that ARINC data that has been determined to not be authentic was received by the ARINC data authenticity inspection module or to provide the ARINC data itself that was determined to not be authentic along with an indication that the ARINC data was determined to not be authentic to another computing system 18, such as an ONS or the like. A record of the ARINC data that was determined to not be authentic may be created, such as by the memory 22 or the computing system 18. This record may include, for example, one or more of the time of receipt of the ARINC data, the source 14 of the ARINC data, the intended destination and other parameters. The record created by the memory 22 or the computing system 18 may be stored, either by the memory or the computing system or off board such as within cloud storage.

In an embodiment in which the inline ARINC data authenticity inspection module 10, such as the processing circuitry 20, has identified particular issues with the ARINC data, such as particular rules of the rule listing associated with the respective ARINC data label that were not satisfied by the ARINC data, the ARINC data authenticity inspection module may also provide information regarding the rules that were not satisfied by the ARINC data, either to memory 22 or to computing system 18 for storage in association with the ARINC data itself. By logging the ARINC data that was determined to not be authentic and, in some embodiments, information regarding the rules that were not satisfied by the ARINC data (that is, rules with which the ARINC data was non-compliant), subsequent forensic analysis of the ARINC data that was determined to not be authentic may be facilitated.

In an instance in which the ARINC data is determined to not be authentic, the ARINC data authenticity inspection module 10, such as the processing circuitry 20, may also be configured to prevent transmission of the ARINC data to the intended destination and to, instead, log the receipt of the ARINC data that is determined to not be authentic. See block 40 of FIG. 2. Additionally or alternatively, in an instance in which the ARINC data is determined to not be authentic, the ARINC data authenticity inspection module 10, such as the processing circuitry and, more particularly, the inspection partition 52 and/or the forwarding partition 54, may be configured to flag the ARINC data, such as by associating a flag or other information with the ARINC data that indicates that the ARINC data was determined to not be authentic. The ARINC data, as flagged, may then be provided to the intended destination, such as a respective avionics endpoint 16. Alternatively, the ARINC data may be provided to the memory 22 or the computing system 18 to facilitate subsequent forensic analysis, sometimes without permitting the ARINC data, even as flagged, to be provided to the intended destination.

Thus, the inline ARINC data authenticity inspection module 10, method and computer program product of an example embodiment confirm the ARINC data to the authentic prior to permitting data corresponding to the ARINC data to be transmitted to the intended destination. Thus, the data received by the intended destination may have improved reliability as a result of the inspection. Further, a record may be created of the ARINC data that is determined to not be authentic, such as by logging the receipt of the ARINC data that is determined not the authentic as well as, in an example embodiment, the source 14 of the ARINC data is determined to not be authentic and an identification of one of more of the rules that were not satisfied by the ARINC data that is determined to not be authentic. As such, the inline ARINC data authenticity inspection module 10, method and computer program product facilitate the subsequent forensic analysis of the avionics system 12 in order to, for example, identify the source of an attack and to facilitate further improvements in the safeguards of the system from ARINC data that includes malformed packets.

FIG. 2 illustrates a flowchart of an inline ARINC data authenticity inspection module 10, method and computer program product according to example embodiments of the present disclosure. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 22 of an inline ARINC data authenticity inspection module 10 employing an embodiment of the present disclosure and executed by processing circuitry 20 of the inline ARINC data authenticity inspection module. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. An inline ARINC data authenticity inspection module comprising processing circuitry configured to inspect ARINC data, the processing circuitry configured to:
receive ARINC data transmitted via an ARINC bus into a buffer partition;
inspect the ARINC data from the buffer partition within an inspection partition by maintaining a rule listing associated with a respective ARINC data label and inspecting the ARINC data for compliance with the rule listing to determine that the ARINC data is authentic;
determine, as a result of having inspected the ARINC data within the inspection partition, whether the ARINC data is authentic;
in an instance in which the ARINC data is determined to not be authentic, log receipt of the ARINC data that is determined to not be authentic; and
in an instance in which the ARINC data is determined to be authentic, permit data corresponding to the ARINC data to be transmitted to an intended destination.

2. An inline ARINC data authenticity inspection module according to claim 1 wherein the processing circuitry is configured to receive the ARINC data by receiving the ARINC data from a source, and wherein the processing circuitry is configured to log receipt of the ARINC data by logging the source of the ARINC data that is determined to not be authentic.

3. An inline ARINC data authenticity inspection module according to claim 1 wherein the processing circuitry is further configured to, in an instance in which the ARINC data is determined to not be authentic, prevent transmission of the ARINC data to the intended destination.

4. An inline ARINC data authenticity inspection module according to claim 1 wherein the processing circuitry is configured to permit the data to be transmitted by providing the ARINC data to a forwarding partition that is configured to transmit the data corresponding to the ARINC data to the intended destination.

5. An inline ARINC data authenticity inspection module according to claim 1 wherein the processing circuitry is further configured to, in an instance in which the ARINC data is determined to not be authentic, flag the ARINC data.

6. An inline ARINC data authenticity inspection module according to claim 1 wherein the processing circuitry is further configured to receive, following inspection of at least some ARINC data, a modification of the rule listing associated with a respective ARINC data label such that subsequent inspection of the ARINC data determines compliance with the modification of the rule listing to determine that the ARINC data is authentic.

7. An inline ARINC data authenticity inspection module according to claim 1 wherein the processing circuitry is further configured to convert the ARINC data to data having another protocol prior to permitting the data having the other protocol and corresponding to the ARINC data to be transmitted to the intended destination.

8. A method of conducting an inline inspection of ARINC data, the method comprising:
receiving ARINC data transmitted via an ARINC bus into a buffer partition;
inspecting the ARINC data from the buffer partition within an inspection partition by maintaining a rule listing associated with a respective ARINC data label and inspecting the ARINC data for compliance with the rule listing to determine that the ARINC data is authentic;
determining, as a result of having inspected the ARINC data within the inspection partition, whether the ARINC data is authentic;
in an instance in which the ARINC data is determined to not be authentic, logging receipt of the ARINC data that is determined to not be authentic; and
in an instance in which the ARINC data is determined to be authentic, permitting data corresponding to the ARINC data to be transmitted to an intended destination.

9. A method according to claim 8 wherein receiving the ARINC data comprises receiving the ARINC data from a source, and wherein logging receipt of the ARINC data comprises logging the source of the ARINC data that is determined to not be authentic.

10. A method according to claim 8 further comprising, in an instance in which the ARINC data is determined to not be authentic, preventing transmission of the ARINC data to the intended destination.

11. A method according to claim 8 wherein permitting the data to be transmitted comprises providing the ARINC data to a forwarding partition that is configured to transmit the data corresponding to the ARINC data to the intended destination.

12. A method according to claim 8 further comprising, in an instance in which the ARINC data is determined to not be authentic, flagging the ARINC data.

13. A method according to claim 8 further comprising receiving, following inspection of at least some ARINC data, a modification of the rule listing associated with a respective ARINC data label such that subsequent inspection of the ARINC data determines compliance with the modification of the rule listing to determine that the ARINC data is authentic.

14. A method according to claim 8 further comprising converting the ARINC data to data having another protocol prior to permitting the data having the other protocol and corresponding to the ARINC data to be transmitted to the intended destination.

15. A computer program product comprising at least one non-transitory computer readable medium having program code portions stored thereon, wherein the program code portions are configured, upon execution, to:
receive ARINC data transmitted via an ARINC bus into a buffer partition;
inspect the ARINC data from the buffer partition within an inspection partition by maintaining a rule listing associated with a respective ARINC data label and inspecting the ARINC data for compliance with the rule listing to determine that the ARINC data is authentic;

determine, as a result of having inspected the ARINC data within the inspection partition, whether the ARINC data is authentic;

in an instance in which the ARINC data is determined to not be authentic, log receipt of the ARINC data that is determined to not be authentic; and in an instance in which the ARINC data is determined to be authentic, permit data corresponding to the ARINC data to be transmitted to an intended destination.

16. A computer program product according to claim 15 wherein the program code portions configured to receive the ARINC data comprise program code portions configured to receive the ARINC data from a source, and wherein the program code portions configured to log receipt of the ARINC data comprise program code portions configured to log the source of the ARINC data that is determined to not be authentic.

17. A computer program product according to claim 15 wherein the program code portions are further configured to receive, following inspection of at least some ARINC data, a modification of the rule listing associated with a respective ARINC data label such that subsequent inspection of the ARINC data determines compliance with the modification of the rule listing to determine that the ARINC data is authentic.

* * * * *